United States Patent [19]

Boberg et al.

[11] 4,213,858
[45] Jul. 22, 1980

[54] SUPPORTING NET

[75] Inventors: Nils G. E. Boberg, Lund; Per-Olov A. V. Carlsson, Sosdala, both of Sweden

[73] Assignee: Gambro AB, Sweden

[21] Appl. No.: 961,481

[22] Filed: Nov. 17, 1978

[30] Foreign Application Priority Data

Nov. 18, 1977 [SE] Sweden ............................... 7713019

[51] Int. Cl.² ...................... B01D 13/00; B01D 31/00
[52] U.S. Cl. .............................. 210/23 R; 210/321 B; 210/497.1; 422/48
[58] Field of Search ............... 210/321 R, 321 A, 490, 210/321 B, 499, 433 M, 23 H, 23 F, 23 R, 22 A, 22 C, 22 D, 497.1; 55/16, 158; 422/48; D47/6 R; 43/7; 245/2; 132/49; 128/DIG. 3; 204/180 P

[56] References Cited

U.S. PATENT DOCUMENTS

| Re. 27,510 | 10/1972 | Hoeltzenbein | 210/321 B |
|---|---|---|---|
| 2,271,662 | 2/1942 | Rubissow | 55/525 |
| 2,537,323 | 1/1951 | Wurzburger | 210/499 |
| 3,164,514 | 1/1965 | Day | 245/2 |
| 3,169,111 | 2/1965 | Rose et al. | 210/499 |
| 3,709,367 | 1/1973 | Martinez | 210/321 B |
| 3,712,473 | 1/1973 | Martinez | 210/456 |
| 3,713,875 | 1/1973 | Beyer et al. | 210/490 |
| 3,729,098 | 4/1973 | Serur | 210/321 B |
| 3,743,098 | 7/1973 | Martinez | 210/321 B |
| 3,780,870 | 12/1973 | Esmond | 210/22 |
| 3,862,036 | 1/1975 | Simmons | 210/82 |
| 3,880,760 | 4/1975 | Flandoli | 210/321 B |
| 4,022,692 | 5/1977 | Janneck | 210/321 B |
| 4,094,792 | 6/1978 | Bentley | 210/321 B |

FOREIGN PATENT DOCUMENTS

| 2287256 | 5/1976 | France | 210/321 A |
|---|---|---|---|
| 2287933 | 5/1976 | France | 210/321 A |
| 2305214 | 10/1976 | France | 210/321 A |
| 1417446 | 12/1975 | United Kingdom | 210/22 |
| 1433512 | 4/1976 | United Kingdom | 210/321 B |

OTHER PUBLICATIONS

Trans. Am. Soc. of Art. Int. Organs, vol. 5, 1959 "Development of a Simplified Membrane Oxygenator", Crescenzi et al.

Primary Examiner—Charles N. Hart
Assistant Examiner—David R. Sadowski
Attorney, Agent, or Firm—Lerner, David, Littenberg & Samuel

[57] ABSTRACT

A supporting net is disclosed including an outer layer of first strands, said first strands being spaced apart and substantially parallel to each other; an intermediate supporting layer of second strands; and an inner layer of third strands, said third strands being spaced apart and substantially parallel to each other, said third strands being substantially parallel to said first strands and being in a spaced relationship to said first strands such that upon clamping a membrane between said supporting net and a second supporting net of the same construction the first strands of the outer layer of said second supporting net penetrate into the spaces between the third strands of the inner layer of the said supporting net so as to clamp the membrane against the intermediate supporting layers of both of the supporting nets.

26 Claims, 4 Drawing Figures

SUPPORTING NET

BACKGROUND OF THE INVENTION

The present invention relates to a supporting net. More particularly, the present invention relates to a supporting net for a membrane in a dialysis device, ultrafiltration device, oxygenator or the like.

A number of constructions for a supporting net are known. For example, U.S. Pat. No. 3,962,095 discloses a membrane support material 14 best shown in FIGS. 3 and 4 of the patent. The membrane support 14 is described as bands of sheet material having on one side a series of spaced apart parallel ribs 16. The ribs 16 have a series of spaced grooves 18 which run substantially parallel to the membrane tube 12 as shown in FIG. 1 of the patent.

U.S. Pat. No. Re 27, 510 discloses a membrane support member best shown in FIGS. 6 and 7 of the patent. The support member 4 is comprised of parallel strands or wires 6 including an upper set of parallel strands 6u and a lower set of parallel strands 6y. When a membrane tube is disposed between two such supporting members as shown in FIG. 7 of the patent, section 2t of the membrane is forced between strands 6u to form therebetween elongated channels 20u and at the same time section 2s of the membrane is forced into plurality of channels 20y between strands 6y. The thickness of the strands, the distance between the strands and the angles between the upper set and lower set of strands are discussed at column 5, lines 52–57 of the patent.

Another such supporting device is disclosed in U.S. Pat. No. 3,963,621 as best seen in FIGS. 3, 4 and 5 of the patent. The membrane support 14 defines on one side thereof a first set of membrane supporting ribs 25 which are disposed longitudinally to the axis 28 of a tubular membrane 16. The first set of supporting ribs 25 define a plurality of rib sections 26 spaced by apertures 30 permitting the flow of fluid transversely across the membrane through ribs 25. The other side of the membrane support 14 defines a second set of ribs 33 which define an angle with the tubular membrane axis 28. The thickness of the membrane support and the height of, shape of and distance between the ribs is discussed in column 3, lines 35–41 of the patent.

Yet another such device is illustrated in U.S. Pat. No. 3,709,367 which discloses a supporting screen 12 best seen in FIGS. 2 and 4–6 of the patent. The supporting screen 12 is formed by a first plurality of strands 26 and a second plurality of strands 28 which are of like cross-section. The preferred cross-section is triangular in shape but other polygonal shapes are said to be suitable. The strands 26 are disposed in an upper pattern and the strands 28 in a lower pattern. Each pattern is supported by and underlies the other pattern. The strands in the upper pattern define an angle with respect to the strands of the lower pattern of less than substantially 90°. The distance between the strands and the size, shape and composition of the strands is discussed in column 7, lines 6–57 in the patent.

Similarly, U.S. Pat. No. 3,743,098 discloses a support screen 20 comprising an extruded plastic netting having two sets of parallel strands lying against each other and defining an angle to each other. As shown in FIGS. 2 through 5 of the patent, the support screen defines a first set of strands 48 which run parallel to the longitudinal spiral axis 50 of a dialysis tube. A second set of strands 52 lies against strands 48, defining an angle with respect to strands 52. The distance between the strands and the thickness of the strands is discussed in the patent at column 3, lines 53–65.

In another similar device shown in U.S. Pat. No. 4,059,530, a web-like element is illustrated consisting of a first portion of a strip or sheet form 2a on which is superimposed a facing second portion of strip form 2b. Between portion 2a and portion 2b is placed a flattened tubular membrane 3. Each portion 2a and 2b comprises a base layer or web 4 which comprises uniformly distributed projections consisting of regular square-based pyramidal elements 5. The pyramidal elements are mutually spaced and aligned longitudinally and transversally so as to define spaces between them forming longitudinal grooves 6 and transverse grooves 7 disposed mutually perpendicular.

U.S. Pat. No. 3,880,760, U.S. Pat. No. 3,712,474, British Pat. No. 1,433,512 and British Pat. No. 1,417,446 likewise disclose supporting materials for dialysis membranes. These such supporting materials are, however, only described generally in these patents. For example, British Pat. No. 1,417,446 describes a supporting screen 3 which is a polyethylene screen of a generally known construction, while British Pat. No. 1,433, 512 describes a supporting gauze 3 of extruded polypropylene netting of a generally known structure. Similarly, the support material is shown in U.S. Pat. No. 3,880,760 as element 16 in FIG. 1 and in U.S. Pat. No. 3,712,474 as element 20 in FIGS. 4 and 7.

SUMMARY OF THE INVENTION

In accordance with the present invention, a supporting net has now been prepared including an outer layer of first strands, which are spaced apart and substantially parallel to each other, an intermediate supporting layer of second strands and an inner layer of third strands which are spaced apart and substantially parallel to each other. The third strands are substantially parallel to the first strands and are in a spaced relationship to the first strands such that, upon clamping of a membrane between two of such supporting nets, the first strands of the outer layer of the second of the supporting nets penetrate into the spaces between the third strands of the inner layer of the first of the supporting nets so as to clamp the membrane against the intermediate supporting layers of both of the supporting nets. Such an apparatus has been found to have substantial advantages, i.e., beneficial flow characteristics through the membrane held by the supporting net and simplicity of manufacture of the net.

In a preferred embodiment of the present invention, the supporting net is helically wound such that in adjacent layers of the helix the first strands of said outer layer penetrate into the spaces between the third strands of the inner layer of said supporting net so as to clamp said membrane against said intermediate supporting layer of the supporting net.

In another preferred embodiment of the present invention, the second strands of said intermediate supporting layer are substantially parallel to each other. Also, it is preferred that the second strands of the intermediate supporting layer be substantially perpendicular to the first and third strands.

In practice, it has been found that the diameter of the first and third strands should be from about 0.1 mm to about 1.5 mm and, preferably, from about 0.4 mm to about 0.8 mm. At the same time, the second strands should have a diameter of from about 0.1 mm to about 1.0 mm and, preferably, from about 0.4 mm to about 0.5 mm. In addition, it is found that the first strands should be spaced about 2 mm to about 20 mm apart and, preferably, about 6 mm to about 10 mm apart. The aforementioned spacing has also been found suitable for the third strands in the inner layer. The second strands in the intermediate layer should be spaced a mutual distance of about 1 mm to about 10 mm apart and, preferably, from about 2 mm to about 4 mm apart. Such dimensions and spacing of the strands results in good flow conditions for two liquids or other fluids, e.g., when the supporting net is used in a dialyzer.

The first, second and third strands of the supporting of the present invention are preferably circular in cross-section. The strands may be constructed as treads, purlins or the like. Moreover, the strands may be manufactured of pure polyvinylchloride, polypropylene or polyethylene or of some other weldable material. Most preferably, the strands are made of an inner material of relatively high melting point, such as glass or polyester, and an outer material of relatively low melting point, such as polyvinylchloride, polypropylene or polyethylene. This two-layer design allows very accurately controlled welding together of the strands so that the net at all times has substantially the same characteristics.

If the supporting net of the present invention is used in a so-called artificial kidney with a membrane tube wound helically together with the supporting net, good flow conditions are obtained for the blood flowing through the tube and for the dialyzate flowing across the membrane tube, i.e., in the space between the second strands of the intermediate layers. In such an application of the supporting net of the present invention, the first strands in the outer layer are preferably placed in a longitudinal direction with respect to the membrane tube, while the second strands of the intermediate layer are arranged substantially at right angles to the longitudinal direction.

The supporting net of the present invention has been found to be very useful in a dialysis arrangement, such as that shown in copending U.S. patent application No. 902,353 filed May 3, 1978, the disclosure of which is incorporated herein by reference. The supporting net of the present invention can, however, be used in other types of helically wound dialysis apparatus, for the replacement of spacing discs in a dialysis apparatus constructed of parallel discs with membranes therebetween, or in other diffusion devices such as an ultrafiltration device or an oxygenator.

BRIEF DESCRIPTION OF THE DRAWINGS

The present invention may be better understood with reference to the figures described as follows.

DETAILED DESCRIPTION

The present invention may be described in greater detail with reference to the figures shown in the preferred embodiment of the present invention, in which like numerals refer to like portions thereof.

Figure 1:
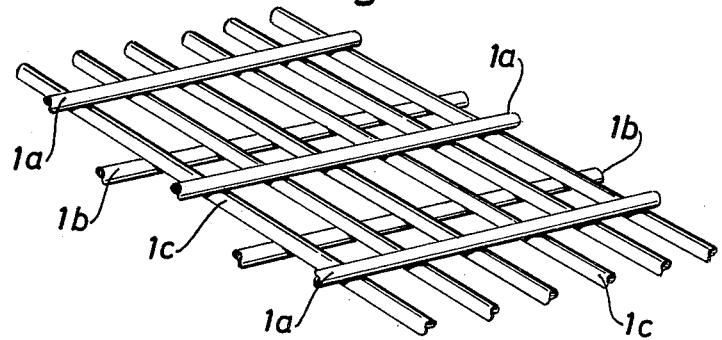
FIG. 1 is a perspective view of a portion of a supporting net in accordance with the present invention.

Referring to FIG. 1, the supporting net in accordance with the present invention comprises an outer layer of first strands $1a$ spaced apart and substantially parallel to each other, an intermediate layer of second strands $1c$ spaced apart and substantially parallel to each other but substantially perpendicular to the first strands $1a$, and an inner layer of third strands $1b$ spaced apart and substantially parallel to each other and substantially parallel to the first strands $1a$.

Figure 2:
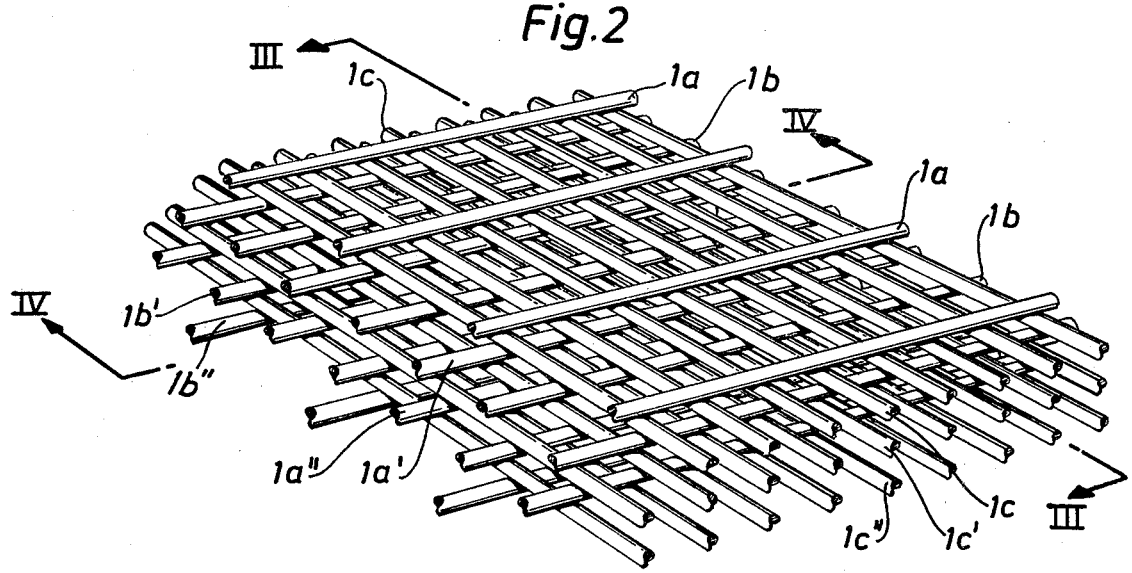
FIG. 2 is a perspective view of three supporting nets in accordance with the present invention placed together.

FIG. 2 shows the construction obtained when three of such supporting nets are placed on top of one another. In FIG. 2, the strands of the uppermost supporting net have been designated $1a$, $1b$ and $1c$, respectively. The strands of the middle supporting net have been designated $1a'$, $1b'$ and $1c'$, respectively, and the strands of the lowest supporting net have been correspondingly designated $1a''$, $1b''$ and $1c''$, respectively.

Figure 3:
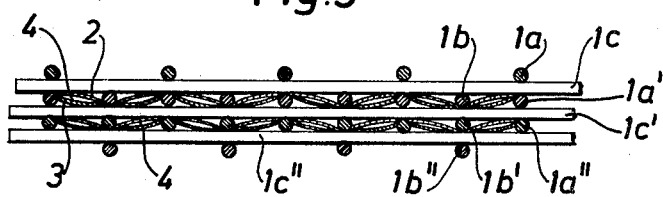
FIG. 3 is a longitudinal cross-sectional view, taken along the line III—III in FIG. 2 and looking in the direction of the arrows, with a membrane tube interposed between adjacent supporting nets.

Referring to FIG. 3, a longitudinal cross-sectional view of the three nets shown in FIG. 2 are illustrated. In addition, FIG. 3 shows membranes 2 and 3 disposed between the uppermost supporting net and the middle supporting net and between the middle supporting net and the lowermost supporting net. The first strands $1a'$ of the middle supporting net penetrate into the spaces between the third strands $1b$ of the uppermost supporting net so as to clamp the membranes 2 and 3 against the second strands $1c$ and $1c'$ of the uppermost and intermediate supporting nets to form a system of ducts or spaces 4 which hang together in the longitudinal direction of the supporting nets as well as in the transverse direction of the supporting nets.

If the construction shown in FIG. 3 is used for a so-called artificial kidney, the spaces 4 are filled with blood, while dialysis fluid is introduced into the spaces between the strands $1c$, $1c'$ and $1c''$. Thus, the distance between the second strands $1c$, $1c'$ and $1c''$ determines the flow resistance for the dialysis liquid. The blood may be introduced into the spaces 4 between the membranes 2 and 3 by any suitable method, for example, by the method described in U.S. patent application No. 902,353 filed May 3, 1978 or in the application of Carlsson and Stenberg entitled "Apparatus for the Closure of the End of a Flattened Tube" filed simultaneously herewith.

Figure 4:
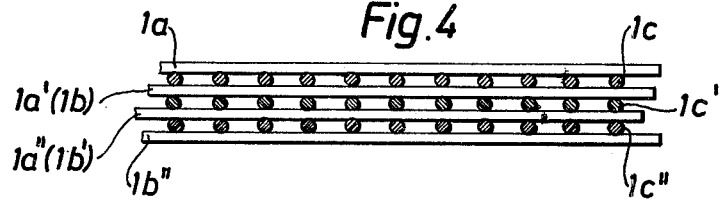
FIG. 4 is a transverse cross-sectional view, taken along the line IV—IV in FIG. 2 and looking in the direction of the arrows.

Referring to FIG. 4, the cross-sectional view of a construction shown in FIG. 2 is illustrated in which prime and double prime designations have again been used to indicate the intermediate and lowermost supporting nets in the construction. The designations $1b$ and $1b'$ have been inserted in brackets since the corresponding threads are concealed behind strands $1a'$ and $1a''$, respectively.

In the Figures, the different nets have been shown lying flat. However, when the supporting net of the present invention is used, for example, with the apparatus shown in U.S. patent application No. 902,353 filed May 3, 1978, the supporting net is helically rolled together with the membrane tube such that in adjacent layers of the helix the first strands of the outer layer penetrate into the space between the third strands of the inner layer of the supporting net so as to clamp said membrane against the intermediate supporting layer of the supporting net.

It will be understood that the embodiments described above are merely exemplary and that persons skilled in the art may make many variations and modifications without departing from the spirit and scope of the invention. All such modifications and variations are intended to be included within the scope of the invention as defined by the appended claims.

What is claimed is:

1. A diffusion apparatus comprising a pair of membrane sheets and a supporting net, said supporting net comprising an outer layer of first strands, said first strands being spaced apart and substantially parallel to each other; an intermediate supporting layer of second strands; and an inner layer of third strands, said third strands being spaced apart and substantially parallel to each other, said third strands being substantially parallel to said first strands and being in a spaced relationship to said first strands such that, upon clamping of said membrane sheets between said supporting net and a second supporting net of the same construction, the first strands in the outer layer of said second supporting net penetrate into the spaces between the third strands of said inner layer of said supporting net so as to clamp said membrane sheets against said intermediate supporting layers of said supporting net and said second supporting net.

2. A diffusion apparatus according to claim 1 in which said supporting net is helically wound with said membrane sheets such that in adjacent layers of the helix, said first strands of said outer layer penetrate into the spaces between said third strands of said inner layer of said supporting net so as to clamp said membrane sheets against adjacent intermediate supporting layers of said supporting net.

3. A diffusion apparatus according to claim 1 or 2 in which said second strands of said intermediate supporting layer are substantially parallel to each other.

4. A diffusion apparatus according to claim 1 or 2 in which said second strands of said intermediate supporting layer are substantially parallel to each other and are substantially perpendicular to said first strands and said third strands.

5. A diffusion apparatus according to claim 1 or 2 in which said first and third strands have diameters of from about 0.1 mm to about 1.5 mm and said second strands have diameters of from about 0.1 to about 1.0 mm.

6. A diffusion apparatus according to claim 1 or 2 in which said first and third strands have diameters of from about 0.4 mm to about 0.8 mm and said second strands have diameters of from about 0.4 mm to about 0.5 mm.

7. A diffusion apparatus according to claim 1 or 2 in which said first strands are spaced about 2 mm to about 20 mm apart from each other, said second strands are spaced about 1 mm to about 10 mm apart from each other and said third strands are spaced about 2 mm to about 20 mm apart from each other.

8. A diffusion apparatus according to claim 1 or 2 in which said first strands are spaced about 6 mm to about 10 mm apart from each other, said second strands are spaced about 2 mm to about 4 mm apart from each other and said third strands are spaced about 6 mm to about 10 mm apart from each other.

9. A diffusion apparatus according to claim 2 in which said membrane sheets are helically wound together with said supporting net and said first and third strands are arranged in longitudinal direction with respect to the membrane sheets and the second strands are arranged substantially perpendicular to said longitudinal direction of the membrane sheets.

10. A diffusion apparatus accoding to claim 1 or 2 in which said first, second annd third strands have substantially circular cross-sections.

11. A diffusion apparatus according to claim 1 or 2 in which said first, second and third strands are comprised of an inner relatively high melting material and an outer relatively low melting point weldable material.

12. A diffusion apparatus comprising a pair of membrane sheets and a supporting net which are wound together helically, said supporting net comprising an outer layer of first strands, said first strands being spaced apart, substantially parallel to each other, and arranged substantially in a longitudinal direction with respect to said membrane sheets; an intermediate supporting layer of second strands arranged substantially perpendicular to said longitudinal direction of said membrane sheets; and an inner layer of third strands, said third strands being spaced apart, substantially in said longitudinal direction and parallel to said first strands, and in a spaced relationship to said first strands such that, upon winding of said membrane sheets together with said supporting net, said first strands of said outer layer penetrate into the spaces between said third strands of said innner layer of said supporting net so as to clamp said membrane sheets against adjacent intermediate supporting layers of said supporting net.

13. A diffusion apparatus according to claim 1 or 12, in which said membrane sheets are in the form of a membrane tube.

14. A method for the diffusion of a liquid between two membrane sheets comprising placing said two membrane sheets one over the other between a first supporting net and a second supporting net, said first and second supporting nets each comprising
(a) an outer layer of first strands, said first strands being spaced apart and substantially parallel to each other,
(b) an intermediate supporting layer of second strands, and
(c) an inner layer of third strands, said third strands being spaced apart and substantially parallel to each other, said third strands being substantially parallel to said first strands and being in a spaced relationship to said first strands such that, upon clamping of said membrane sheets between said first and second supporting nets, the first strands in the outer layer of said second supporting net penetrate into the spaces between the third strands of said inner layer of said first supporting net so as to clamp said membrane sheets against said intermediate supporting layers of said first supporting net and said second supporting net; and diffusing said liquid between said membrane sheets.

15. A method according to claim 14, in which said second supporting net is a continuation of said first supporting net in that said first and second supporting nets are monolithically formed as one supporting net and said one supporting net is helically wound with said membrane sheets such that in adjacent layers of the helix, said first strands of said outer layer penetrate into the spaces between said third strands of said inner layer of said one supporting net so as to clamp said membrane sheets against adjacent intermediate supporting layers of said one supporting net.

16. A method according to claim 14 or 15 in which said second strands of said intermediate supporting layer are substantially parallel to each other.

17. A method according to claim 14 or 15 in which said second strands of said intermediate supporting layer are substantially parallel to each other and are substantially perpendicular to said first strands and said third strands.

18. A method according to claim 14 or 15 in which said first and third strands have diameters of from about 0.1 mm to about 1.5 mm and said second strands have diameters of from about 0.1 to about 1.0 mm.

19. A method according to claim 14 or 15 in which said first and third strands have diameters of from about 0.4 mm to about 0.8 mm and said second strands have diameters of from about 0.4 mm to about 0.5 mm.

20. A method according to claim 14 or 15 in which said first strands are spaced about 2 mm to about 20 mm apart from each other, said second strands are spaced about 1 mm to about 10 mm apart from each other and said third strands are spaced about 2 mm to about 20 mm apart from each other.

21. A method according to claim 14 or 15 in which said first strands are spaced about 6 mm to about 10 mm apart from each other, said second strands are spaced about 2 mm to about 4 mm apart from each other and said third strands are spaced about 6 mm to about 10 mm apart from each other.

22. A method according to claim 15 in which said membrane sheets are helically wound together with said one supporting net and said first and third strands are arranged in longitudinal direction with respect to the membrane sheets and the second strands are arranged substantially perpendicular to said longitudinal direction of the membrane sheets.

23. A method according to claim 14 or 15 in which said first, second and third strands have substantially circular cross-sections.

24. A method according to claim 14 or 15 in which said first, second and third strands are comprised of an inner relatively high melting material and an outer relatively low melting point weldable material.

25. A method for the diffusion of a liquid between two membrane sheets comprising helically winding said two membrane sheets together with a supporting net, said supporting net comprising
(a) an outer layer of first strands, said first strands being spaced apart, substantially parallel to each other and arranged substantially in a longitudinal direction with respect to said membrane sheets;
(b) an intermediate supporting layer of second strands arranged substantially perpendicular to said longitudinal direction; and
(c) an inner layer of third strands, said third strands being spaced apart, arranged substantially in said longitudinal direction and substantially parallel to said first strands, and in a spaced relationship to said first strands such that, upon winding of said membrane sheets together with said supporting net, the first strands in the outer layer of said supporting net penetrate into the spaces between the third strands of said inner layer of said supporting net so as to clamp said membrane sheets against adjacent intermediate supporting layers of said supporting net; and diffusing a liquid between said membrane sheets.

26. A method according to claims 14 or 25 in which said membrane sheets are in the form of a membrane tube.

* * * * *